United States Patent [19]
Kato et al.

[11] Patent Number: 6,006,080
[45] Date of Patent: Dec. 21, 1999

[54] RECEIVING MIXER CIRCUIT FOR MOBILE RADIO TRANSCEIVER DESIGNED TO OPERATE WITH MULTIPLE MODULATION MODES AND MULTIPLE FREQUENCY BANDS

[75] Inventors: Hidenobu Kato; Keiichi Nakayama; Seiichi Yamaguchi; Takashi Enoki; Manabu Yamaguchi, all of Yokohama; Kaoru Ishida, Shijonawate; Hiroaki Kosugi, Hirakata, all of Japan

[73] Assignee: Matsushita Electric Industrial Co., Ltd., Osaka, Japan

[21] Appl. No.: 08/910,940

[22] Filed: Aug. 8, 1997

[30] Foreign Application Priority Data

Aug. 8, 1996 [JP] Japan .................................. 8-209506

[51] Int. Cl.⁶ .............................. H04B 1/26; H04B 1/110; H04B 1/08
[52] U.S. Cl. ........................ 455/323; 455/326; 455/304; 455/313; 455/306; 455/188.1
[58] Field of Search ................................... 455/323, 324, 455/326, 304–306, 317, 318, 314, 315, 179.1, 188.1, 325, 313

[56] References Cited

U.S. PATENT DOCUMENTS

| | | | |
|---|---|---|---|
| 2,964,622 | 12/1960 | Fire | 455/304 |
| 3,070,747 | 12/1962 | Addleman | 455/305 |
| 4,313,220 | 1/1982 | Lo et al. | 455/304 |
| 4,731,875 | 3/1988 | Mizukami et al. | 455/317 |
| 4,926,500 | 5/1990 | Tsuda et al. | 455/318 |
| 5,020,147 | 5/1991 | Okanobu | 455/302 |

OTHER PUBLICATIONS

Y. Konishi et al., "Microwave Semiconductor Circuit, "pp. 196–205.

Primary Examiner—William G. Trost
Assistant Examiner—Tracy M. Legree
Attorney, Agent, or Firm—Ratner & Prestia

[57] ABSTRACT

A receiving mixer device for a mobile radio transceiver which operates with multiple modulation modes and within multiple frequency bands. The receiving mixer includes a plurality of mixers each for converting a received radio frequency signal to an intermediate frequency, a common connection part to which output terminals of the mixers are connected in common, a plurality of impedance conversion circuits connected to the common connection part, and output terminals for the impedance conversion circuits. The number of mixers is equal to the number of frequency bands of the received radio frequency signal. The number of the intermediate frequencies is equal to the number of modulation modes of the received radio frequency signal. The number of the impedance conversion circuits is equal to the number of intermediate frequencies, and each of the impedance conversion circuits passes only a single predetermined frequency of the intermediate frequencies used by the device.

25 Claims, 5 Drawing Sheets

RECEIVING MIXER CIRCUIT FOR MOBILE RADIO TRANSCEIVER DESIGNED TO OPERATE WITH MULTIPLE MODULATION MODES AND MULTIPLE FREQUENCY BANDS

BACKGROUND OF THE INVENTION

1. Field of the Invention

The present invention relates to a mobile communication radio transceiver designed to operate with multiple modulation modes and multiple frequency bands, wherein the mobile communication radio transceiver operates by switching frequency bands or modulation modes in a plurality of mobile communication systems among which different radio frequency bands and different modulation modes are used. The invention also relates to a receiving mixer circuit for such a mobile communication radio transceiver.

2. Related art of the Invention

FIG. 5 shows an example of a prior art mobile radio transceiver configuration for implementing simultaneously two mobile communication systems that use two different modulation modes with the same frequency band and a mobile communication system that uses either of two modulation modes and two different frequency bands. FIG. 5 shows the block diagram for a multi-mode and multi-band mobile radio transceiver that operates by switching among a mobile communication system A which uses a first radio frequency band and a first modulation mode, a mobile communication system B which uses a second radio frequency band and employs the same first modulation mode as the system A, and a mobile communication system C which uses the same second radio frequency band as the system B and employs a second modulation mode.

In FIG. 5, reference numeral 1 is an antenna, 2 is a frequency select switch for switching between the first and second radio frequency bands, 3 is a first duplexer for the first radio frequency band, 4 is a second duplexer for the second radio frequency band, 5 is a first low-noise amplifier for a first receive frequency band, 6 is a second low-noise amplifier for a second receive frequency band, 7 is a first receiving mixer for the first receive frequency band, 8 is a second receiving mixer for the second receive frequency band, 9 is a first local oscillator for the first radio frequency band, 10 is a second local oscillator for the second radio frequency band, 13 is a first intermediate-frequency filter with a first receive bandwidth corresponding to a first receive intermediate frequency of the first modulation mode, 14 is a second intermediate-frequency filter with a second receive bandwidth corresponding to a second receive intermediate frequency of the second modulation mode, 11 and 12 are select switches for directing the first and second receive intermediate-frequency signals to the corresponding intermediate-frequency filters, 15 is a first demodulator for the first modulation mode, 16 is a second demodulator for the second modulation mode, 17 is a first transmitter for a first transmit frequency band, and 18 is a second transmitter for a second transmit frequency band.

As an example, consider the case where the first transmit frequency range is f1TX=1850 MHz to 1910 MHz, the first receive frequency range is f1RX=1930 MHz to 1990 MHz, the second transmit frequency range is f2TX=824 MHz to 849 MHz, the second receive frequency range is f2RX=869 MHz to 894 MHz, the first receive intermediate frequency is f1IF=180 MHz, the first receive bandwidth is W1=1.23 MHz, the second receive intermediate frequency is f2IF=90 MHz, and the second receive bandwidth is W2=30 KHz.

Referring to FIG. 5, the operation of the mobile communication system A will be described first. A signal on the first radio frequency band transmitted from a base radio transceiver station is received by the antenna 1, and by switching the frequency select switch 2 to the A side, the received signal is fed into the first duplexer 3 where it is separated from the transmitting signal. The separated received signal is amplified by the first low-noise amplifier 5, and converted by the first receiving mixer 7 to the first receive intermediate frequency f1IF. By switching the first select switch 11 to the A side, the output signal of the first receiving mixer 7 is fed into the first intermediate-frequency filter 13. After passing through the first intermediate-frequency filter 13, the signal is input to the first demodulator 15 for demodulation.

Next, the operation of the mobile communication system B will be described. A signal on the second radio frequency band transmitted from a base radio transceiver station is received by the antenna 1, and by switching the frequency select switch 2 to the B side, the received signal is fed into the second duplexer 4 where it is separated from the transmitting signal. The separated received signal is amplified by the second low-noise amplifier 6, and converted by the second receiving mixer 8 to the first receive intermediate frequency f1IF. By switching the first select switch 11 to the B side and the second select switch 12 to the A side, the output signal of the second receiving mixer 8 is fed into the first intermediate-frequency filter 13. After passing through the first intermediate-frequency filter 13, the signal is input to the first demodulator 15 for demodulation.

Finally, the operation of the mobile communication system C will be described. A signal on the second radio frequency band transmitted from a base radio transceiver station is received by the antenna 1, and by switching the frequency select switch 2 to the B side, the received signal is fed into the second duplexer 4 where it is separated from the transmitting signal. The separated received signal is amplified by the second low-noise amplifier 6, and converted by the second receiving mixer 8 to the second receive intermediate frequency f2IF. By switching the second select switch 12 to the B side, the output signal of the second receiving mixer 8 is fed into the second intermediate-frequency filter 14. After passing through the second intermediate-frequency filter 14, the signal is input to the second demodulator 16 for demodulation.

However, since the select switches 11 and 12 are needed to direct the signals output from the receiving mixers to the appropriate intermediate-frequency filters corresponding to the respective modulation modes, the receiving mixer circuit of the above prior art configuration has had the problem that it is disadvantageous in terms of the size and cost of the circuit.

SUMMARY OF THE INVENTION

The present invention has been devised to overcome the problem of the prior art, and an object of the invention is to provide a receiving mixer circuit that is inexpensive and small in circuit size by using impedance conversion circuits and thus eliminating the need for select switches.

The present invention provides a receiving mixer for a mobile radio transceiver designed to operate with multiple modulations and multiple frequency bands, comprising: a plurality of mixers each for converting a received radio frequency signal to an intermediate frequency; a common connection part to which output terminals of said mixers are connected in common; a plurality of impedance conversion means connected to said common connection part; and output terminals for said impedance conversion means; wherein said mixers are equal in number to the kinds of frequencies of said received radio frequency signal, the number of kinds of said intermediate frequencies is the same as the number of modulation modes that the frequency of said received radio frequency signal has, the number of said impedance conversion means is the same as the number of kinds of said intermediate frequencies, and each of said impedance conversion means passes only one uniquely predetermined frequency out of said kinds of intermediate frequencies.

PREFERRED EMBODIMENTS OF THE INVENTION

Embodiments of the present invention will be described below with reference to drawings.

For simplicity of explanation, the embodiments hereinafter described deal with the configuration of a composite mobile radio transceiver for use in mobile communication systems among which two modulation modes and two frequency band methods are used, wherein the composite mobile radio transceiver operates by switching among a mobile communication system A which uses the first radio frequency band and the first modulation mode, a mobile communication system B which uses the second radio frequency band and employs the same first modulation mode as the mobile communication system A, and a mobile communication system C which uses the same second radio frequency band as the mobile communication system B and employs the second modulation mode.

Figure 1:
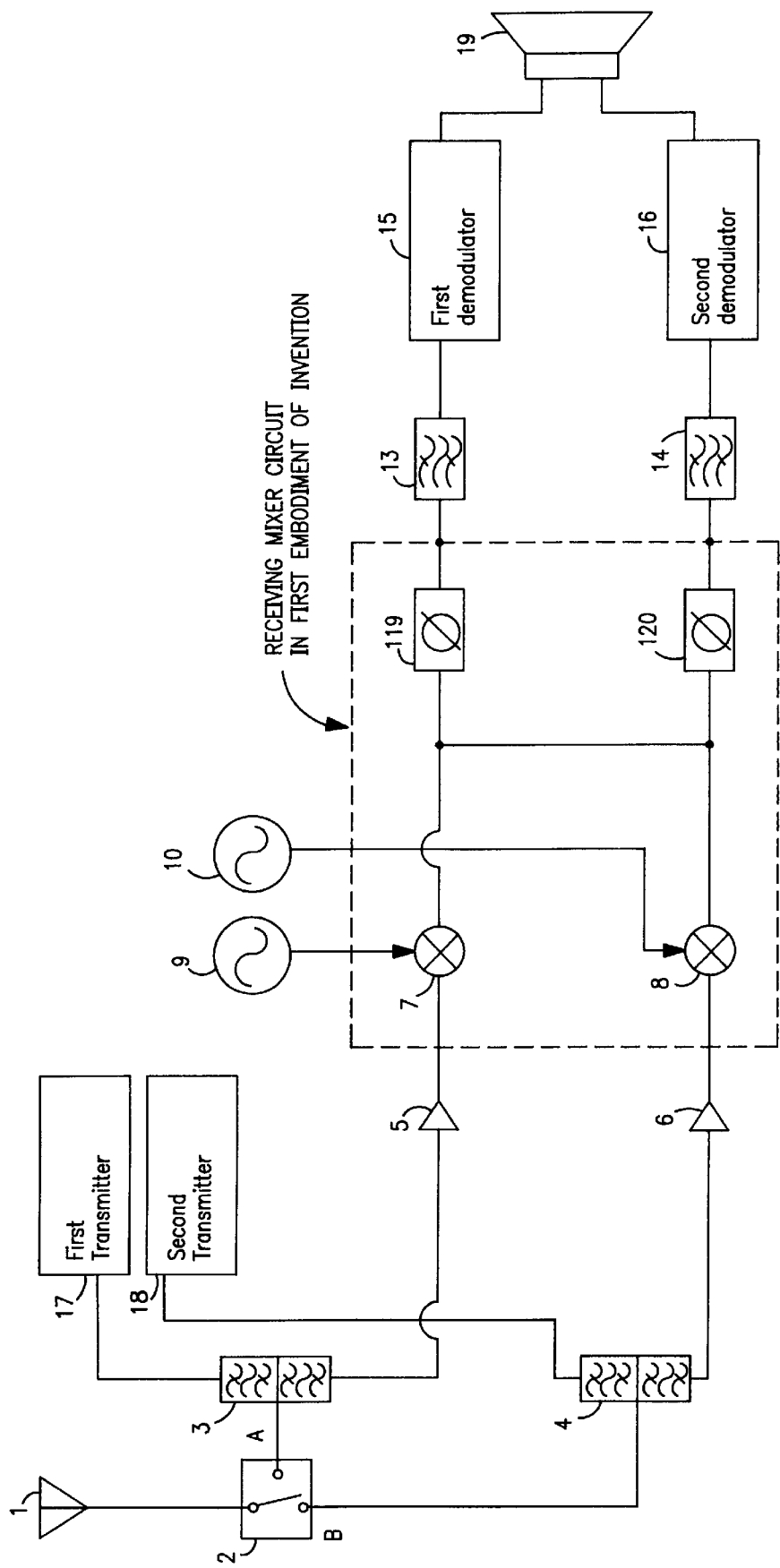
FIG. 1 is a simplified block diagram of a mobile radio transceiver according to a first embodiment of the present invention, designed to operate in a plurality of mobile communication systems among which two frequency bands and two transmission systems are used.

FIG. 1 shows the block diagram for a first embodiment of the present invention. In FIG. 1, reference numeral 1 is an antenna, 2 is a frequency select switch for switching between the first and second radio frequency bands, 3 is a first duplexer for the first radio frequency band, 4 is a second duplexer for the second radio frequency band, 5 is a first low-noise amplifier for a first receive frequency band, 6 is a second low-noise amplifier for a second receive frequency band, 7 is a first receiving mixer for the first receive frequency band, 8 is a second receiving mixer for the second receive frequency band, 9 is a first local oscillator for the first radio frequency band, 10 is a second local oscillator for the second radio frequency band, 13 is a first intermediate-frequency filter having a first receive bandwidth for passing a first receive intermediate frequency of the first modulation mode, 14 is a second intermediate-frequency filter having a second receive bandwidth for passing a second receive intermediate frequency of the second modulation mode, 15 is a first demodulator for the first modulation mode, 16 is a second demodulator for the second modulation mode, 17 is a first transmitter for a first transmit frequency band, 18 is a second transmitter for a second transmit frequency band, and 19 is an amplified speaker. Further, reference numeral 119 is a first phaser (phase shifter), and 120 is a second phaser (phase shifter). The first phaser (phase shifter) 119 and the second phaser (phase shifter) 120 are connected together at their input side.

Here, as in the prior art example, consider the case where the first transmit frequency range is f1TX=1850 MHz to 1910 MHz, the first receive frequency range is f1RX=1930 MHz to 1990 MHz, the second transmit frequency range is f2TX=824 MHz to 849 MHz, and the second receive frequency range is f2RX=869 MHz to 894 MHz, while the first receive intermediate frequency is f1IF=180 MHz, the first receive bandwidth is W1=1.23 MHz, the second receive intermediate frequency is f2IF=90 MHz, and the second receive bandwidth is W2=30 KHz.

Referring to FIG. 1, the operation of the mobile communication system A will be described first. A signal on the first radio frequency band transmitted from a base radio transceiver station is received by the antenna 1, and by switching the frequency select switch 2 to the A side, the received signal is fed into the first duplexer 3 where it is separated from the transmitting signal. The separated received signal is amplified by the first low-noise amplifier 5, and converted by the first receiving mixer 7 to the receive intermediate frequency f1IF of the first modulation mode. Here, the phase Φ1 of the first phaser (phase shifter) 119 is rotated so as to increase the impedance to the second receive intermediate frequency f2IF without impairing the pass characteristic of the first receive intermediate frequency f1IF. At the same time, the phase Φ2 of the second phaser (phase shifter) 120 is rotated so as to increase the impedance to the receive intermediate frequency f1IF of the first modulation mode to block the output of the first receive intermediate frequency while not impairing the pass characteristic of the second receive intermediate frequency f2IF and thus allowing it to pass through for output. As a result, the output signal of the first receiving mixer 7 is input to the first intermediate-frequency filter 13 having the bandwidth W1 corresponding to the receive intermediate frequency f1IF of the first modulation mode. After passing through the first intermediate-frequency filter 13, the signal is input to the first demodulator 15 for demodulation.

Next, the operation of the mobile communication system B will be described. A signal on the second radio frequency band transmitted from a base radio transceiver station is received by the antenna 1, and by switching the frequency select switch 2 to the B side, the received signal is fed into the second duplexer 4 where it is separated from the transmitting signal. The separated received signal is amplified by the second low-noise amplifier 6, and converted by the second receiving mixer 8 to the receive intermediate frequency f1IF of the first modulation mode. The output signal (first receive intermediate frequency) of the second receiving mixer 8 is input to the first and second phasers (phase shifters) operating on the principles described for the operation of the mobile communication system A, so that only the first receive intermediate frequency f1IF is input to the first intermediate-frequency filter 13 having the bandwidth W1 corresponding to the receive intermediate frequency f1IF of the first modulation mode. After passing through the first intermediate-frequency filter 13, the signal is input to the first demodulator 15 for demodulation.

Finally, the operation of the mobile communication system C will be described. A signal on the second radio frequency band transmitted from a base radio transceiver station is received by the antenna 1, and by switching the frequency select switch 2 to the B side, the received signal is fed into the second duplexer 4 where it is separated from the transmitting signal. The separated received signal is amplified by the second low-noise amplifier 6, and by adjusting the second local oscillator 10, the signal is converted by the second receiving mixer 8 to the receive intermediate frequency f2IF of the second modulation mode. The output signal (second receive intermediate frequency) of the second receiving mixer 8 is input to the first and second phasers (phase shifters) operating on the principles described for the operation of the mobile communication system A, so that only the second receive intermediate frequency f2IF is input to the second intermediate-frequency filter 14 having the bandwidth W2 corresponding to the receive intermediate frequency f2IF of the second modulation mode. After passing through the second intermediate-frequency filter 14, the signal is input to the second demodulator 16 for demodulation. The demodulated signal is then input from the first demodulator 15 or the second demodulator 16 to amplified speaker 19 and converted into sound.

Figure 2:
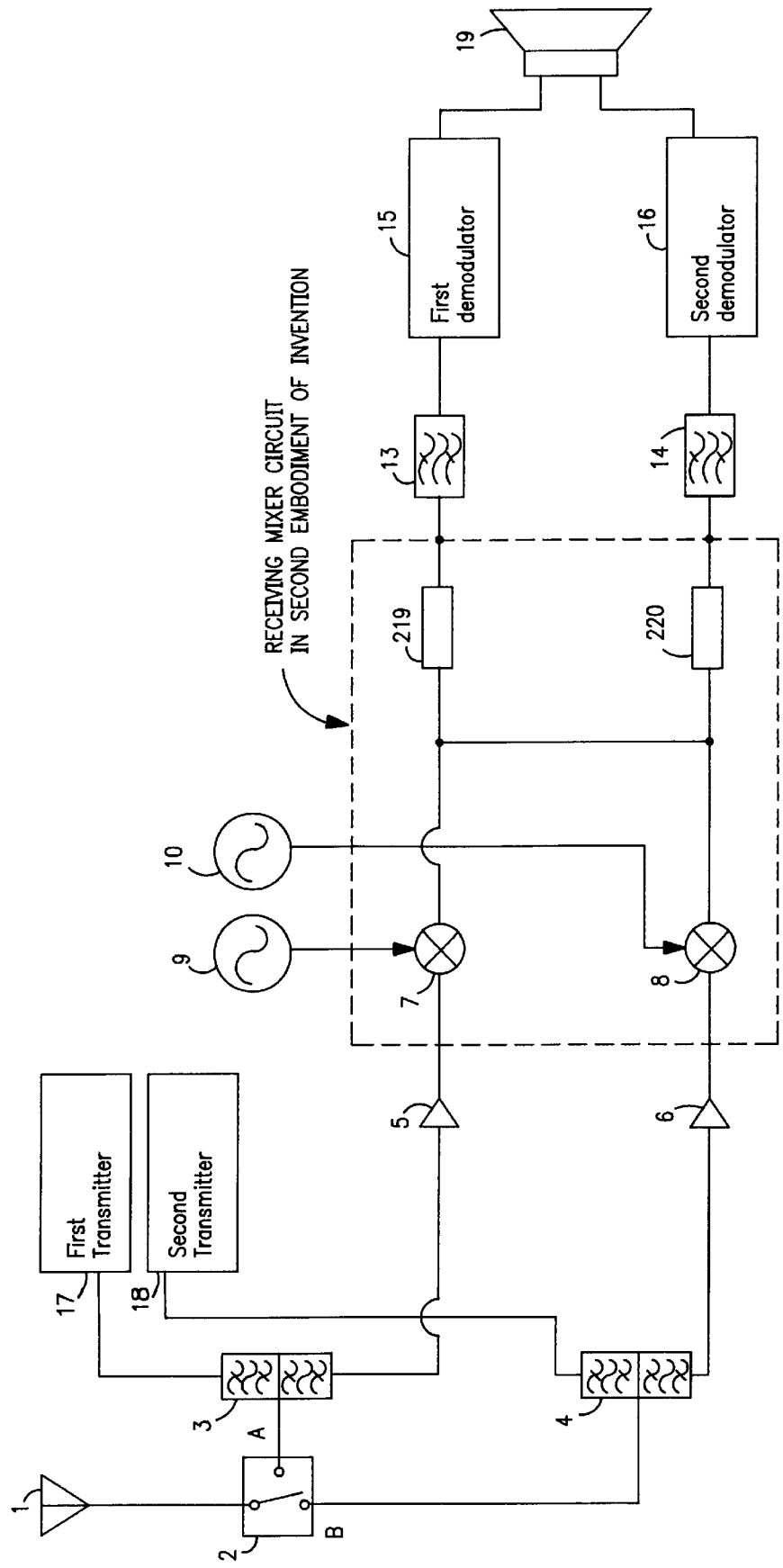
FIG. 2 is a simplified block diagram of a mobile radio transceiver according to a second embodiment of the present invention, designed to operate in a plurality of mobile communication systems among which two frequency bands and two transmission systems are used.

FIG. 2 shows the block diagram for a second embodiment of the present invention.

In FIG. 2, reference numeral 219 is a first transmission line corresponding to the first phaser (phase shifter) 119 as an impedance conversion circuit in the first embodiment, and 220 is a second transmission line corresponding to the second phaser (phase shifter) 120 as an impedance conversion circuit in FIG. 1. Otherwise, the configuration is the same as that of the first embodiment, and therefore, a detailed explanation will be omitted here. By adjusting the transmission line lengths L1 and L2, the transmission lines are capable of the same impedance conversion as achieved by the phasers (phase shifters) of the first embodiment, and the same effect can be obtained by the use of these transmission lines.

Figure 3:
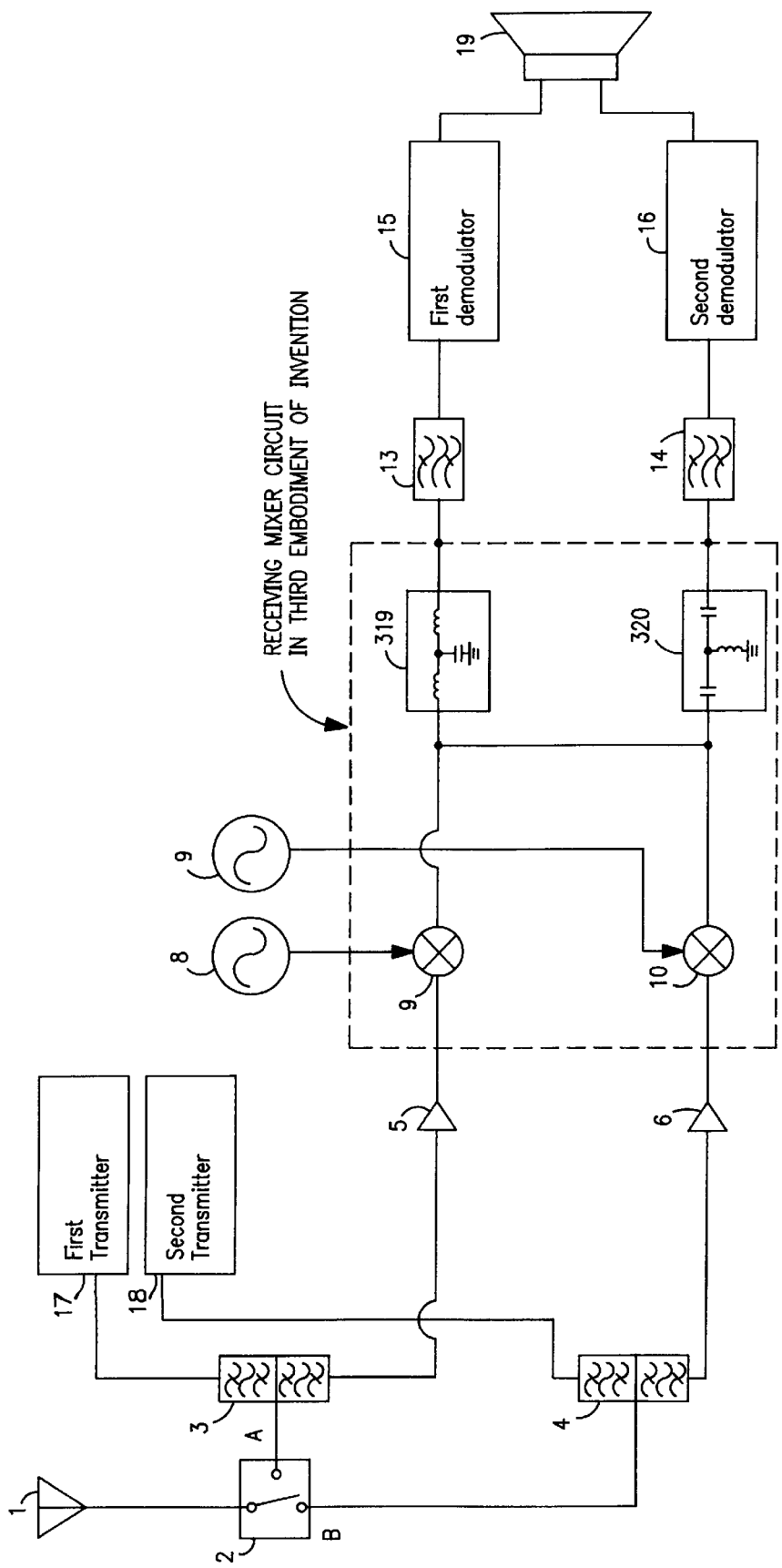
FIG. 3 is a simplified block diagram of a mobile radio transceiver according to a third embodiment of the present invention, designed to operate in a plurality of mobile communication systems among which two frequency bands and two transmission systems are used.

FIG. 3 shows the block diagram for a third embodiment of the present invention. In FIG. 3, reference numeral 319 is a first lumped-constant circuit corresponding to the first phaser (phase shifter) 119 as an impedance conversion circuit in the first embodiment, and 320 is a second lumped-constant circuit corresponding to the second phaser (phase shifter) 120 as an impedance conversion circuit in the first embodiment. Otherwise, the configuration is the same as that of the first embodiment, and therefore, a detailed explanation will be omitted here. The same effect as achieved in the first and second embodiments can be obtained by constructing the first lumped-constant circuit 319 as a high-pass filter circuit that passes the receive intermediate frequency of 180 MHz but blocks the receive intermediate frequency of 90 MHz, and the second lumped-constant circuit 320 as a low-pass filter circuit that passes the receive intermediate frequency of 90 MHz but blocks the receive intermediate frequency of 180 MHz.

The description of the first, second, and third embodiments has dealt with the configuration of a mobile radio transceiver operating in three composite mobile communication systems among which two modulation modes and two frequency bands are used, but it will be recognized that similar configurations can be fabricated for four composite mobile communication systems among which two modulation modes and two frequency bands are used, or for other composite mobile communication systems among which three or more modulation modes and three or more frequency bands are used.

Furthermore, although the above embodiments have been described based on particular frequency sets, it will be appreciated that the configurations can be similarly fabricated if other frequency sets are used.

Figure 4:
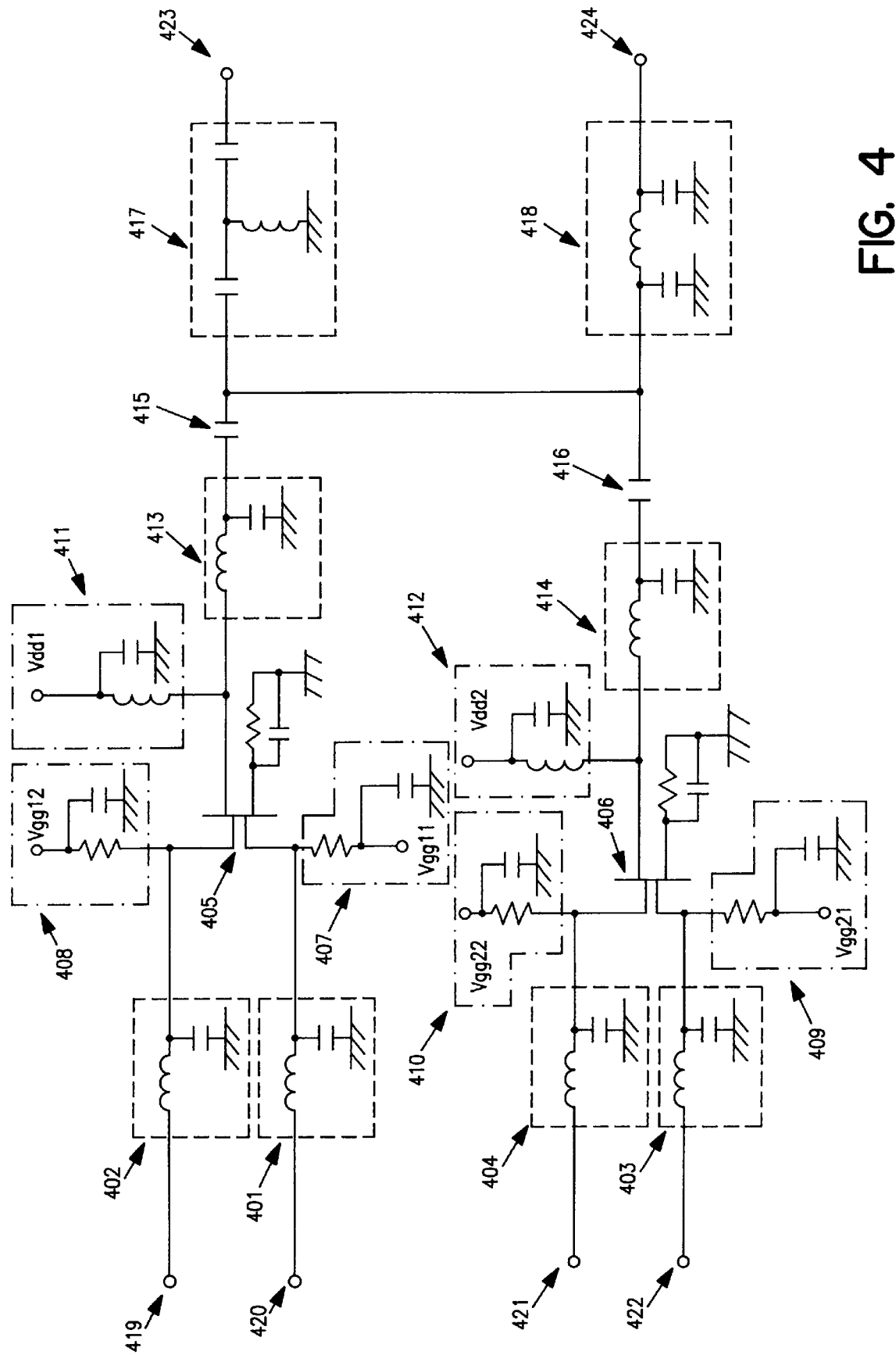
FIG. 4 is a detailed circuit diagram of a receiving mixer using dual-gate FETs according to a fourth embodiment of the present invention.
Figure 5:
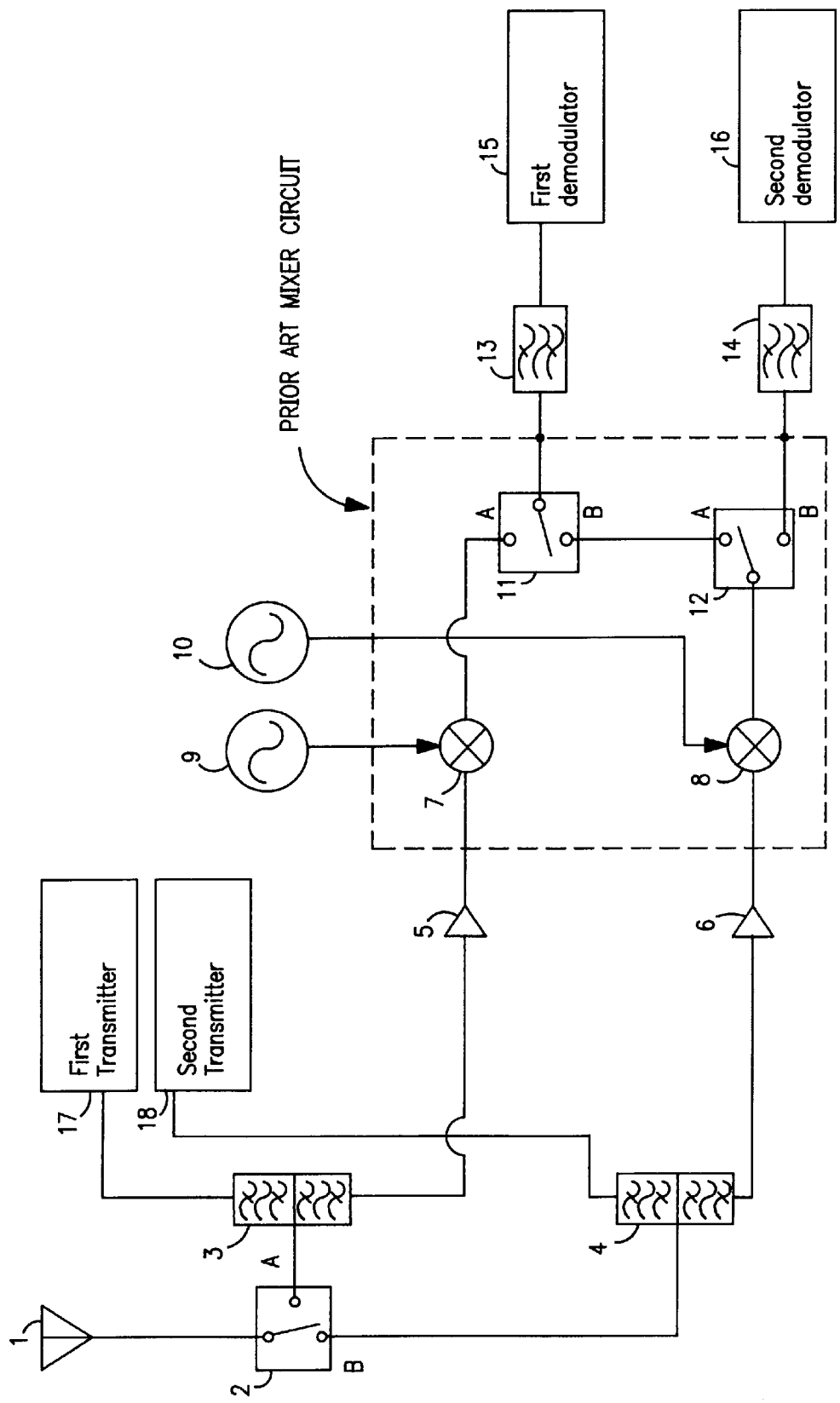
FIG. 5 is a simplified block diagram of a mobile radio transceiver according to prior art, designed to operate in a plurality of mobile communication systems among which two frequency bands and two transmission systems are used.

FIG. 4 is a detailed circuit diagram showing an example of the receiving mixer circuit as used in the first, second, and third embodiments but using dual-gate FETs according to a fourth embodiment of the present invention.

In FIG. 4, reference numeral 401 is a first receive frequency matching circuit, 402 is a first local oscillator frequency matching circuit, 403 is a second receive frequency matching circuit, 404 is a second local oscillator frequency matching circuit, 405 is a first dual-gate FET, 406 is a second dual-gate FET, 407 is a first first-gate-biasing circuit, 408 is a first second-gate-biasing circuit, 409 is a second first-gate-biasing circuit, 410 is a second second-gate-biasing circuit, 411 is a first drain-biasing circuit, 412 is a second drain-biasing circuit, 413 is a first receive intermediate frequency matching circuit, 414 is a second receive intermediate frequency matching circuit, 415 and 416 are DC-cut capacitors, 417 is a first impedance conversion circuit, 418 is a second impedance conversion circuit, 419 is a first local oscillator frequency input terminal, 420 is a first receive frequency input terminal, 421 is a second local oscillator frequency input terminal, 422 is a second receive frequency input terminal, 423 is a first receive intermediate frequency output terminal, and 424 is a second receive intermediate frequency output terminal. In addition, the receiving mixer circuit may be fabricated on the same semiconductor substrate.

Operation will be described next. As an example, consider the case where the first receive frequency range is f1RX= 1930 MHz to 1990 MHz, the second receive frequency range is f2RX=869 MHz to 894 MHz, the first local oscillator frequency band is f1LO=2110 MHz to 2170 MHz, the second local oscillator frequency band is f2LO=959 MHz to 1074 MHz, the first receive intermediate frequency is f1IF= 180 MHz, the first receive bandwidth is W1=1.23 MHz, the second receive intermediate frequency is f2IF=90 MHz, and the second receive bandwidth is W2=30 KHz.

First, the mobile communication system A will be described. A dual-gate FET mixer is constructed by connecting the matching circuit 401 and biasing circuit 407 to the first gate of the first dual-gate FET 405, the matching circuit 402 and biasing circuit 408 to the second gate, and the matching circuit 413 and biasing circuit 411 to the drain. The first gate of the first dual-gate FET 405 is supplied with a signal of the first receive frequency f1RX input via the terminal 420 and passed through the matching circuit 401, while the second gate thereof is supplied with a signal of the first local oscillator frequency f1LO input via the terminal 419 and passed through the matching circuit 402. In this situation, a signal converted to the first receive intermediate frequency f1IF is output from the drain, and passed through the matching circuit 413 and through the capacitor 415 in this order. Here, the phase Φ1 of the first impedance conversion circuit 417 is adjusted so as to increase the impedance to the receive intermediate frequency f2IF of the second modulation mode, thus blocking the output of the second receive intermediate frequency f2IF and allowing only the first receive intermediate frequency f1IF to be output, and the phase Φ2 of the second impedance conversion circuit 418 is adjusted so as to increase the impedance to the receive intermediate frequency f1IF of the first modulation mode, thus blocking the output of the first receive intermediate frequency f1IF and allowing only the second receive intermediate frequency f2IF to be output. As a result, the output signal of the first receiving mixer is output at the terminal 423.

Next, the mobile communication systems B and C will be described. A dual-gate FET mixer is constructed by connecting the matching circuit 403 and biasing circuit 409 to the first gate of the second dual-gate FET 406, the matching circuit 404 and biasing circuit 410 to the second gate, and the matching circuit 414 and biasing circuit 412 to the drain. The first gate of the second dual-gate FET 406 is supplied with a signal of the second receive frequency f2RX input via the terminal 422 and passed through the matching circuit 403, while the second gate thereof is supplied with a signal of the second local oscillator frequency f2LO input via the terminal 421 and passed through the matching circuit 404. In this situation, from the drain is output a signal converted to the first receive intermediate frequency f1IF in the case of the mobile communication system B, or a signal converted to the second receive intermediate frequency f2IF in the case of the mobile communication system C, and the output signal is then passed through the matching circuit 414 and through the capacitor 416 in this order. Here, based on the operating principles of the impedance conversion circuits 417 and 418 as described for the mobile communication system A. The output signal of the first receiving mixer for the mobile communication system B is output at the terminal 423, and the output signal of the second receiving mixer for the mobile communication system C is output at the terminal 424.

As is apparent from the above description, the present invention has the effect of being able to achieve a receiving mixer circuit that is inexpensive, small in circuit size, and does not need control by select switches as required in the prior art, for a mobile radio transceiver designed to operate in mobile communication systems among which multiple modulation modes and multiple frequency band methods are used.

What is claimed is;:

1. A receiving mixer for a mobile radio transceiver designed to operate with multiple modulation modes and multiple frequency bands, comprising: a plurality of mixers each for converting a received radio frequency signal to an intermediate frequency; a common connection part to which output terminals of said mixers are connected in common; a plurality of impedance conversion means connected to said common connection part; and output terminals for said impedance conversion means; wherein said mixers are equal in number to the kinds of frequencies of said received radio frequency signal, the number of kinds of said intermediate frequencies is the same as the number of modulation modes that the frequency of said received radio frequency signal has, the number of said impedance conversion means is the same as the number of kinds of said intermediate frequencies, and each of said impedance conversion means passes only one uniquely predetermined frequency out of said kinds of intermediate frequencies.

2. A receiving mixer circuit according to claim 1, wherein phasers (phase shifters) are used as said impedance conversion circuits.

3. A receiving mixer circuit according to claim 2, wherein said mixer uses a dual-gate FET whose source is grounded, whose first gate is connected to a receive frequency matching means and a first gate bias supplying means, whose second gate is connected to a local oscillator frequency matching means and a second gate bias supplying means, and whose drain is connected to a receive intermediate frequency matching means and a drain bias supplying means.

4. A receiving mixer circuit according to claim 3, wherein said dual-gate FET, said frequency matching means, said bias supplying means, and said impedance conversion means are fabricated on a single semiconductor substrate.

5. A receiving mixer circuit according to claim 4, wherein the source of said dual-gate FET is connected to a resistor and a capacitor in parallel, whose other ends are grounded to bias the first and second gates of said dual-gate FET to ground potential.

6. A receiving mixer circuit according to claim 3, wherein the source of said dual-gate FET is connected to a resistor and a capacitor in parallel, whose other ends are grounded to bias the first and second gates of said dual-gate FET to ground potential.

7. A mobile communication radio transceiver comprising: a receiving mixer circuit according to claim 2; demodulating means for demodulating the outputs of said impedance conversion means; and a speaker for converting the demodulated signals into sound.

8. A receiving mixer circuit according to claim 1, wherein transmission lines are used as said impedance conversion circuits.

9. A receiving mixer circuit according to claim 8, wherein said mixer uses a dual-gate FET whose source is grounded, whose first gate is connected to a receive frequency matching means and a first gate bias supplying means, whose second gate is connected to a local oscillator frequency matching means and a second gate bias supplying means, and whose drain is connected to a receive intermediate frequency matching means and a drain bias supplying means.

10. A receiving mixer circuit according to claim 9, wherein said dual-gate FET, said frequency matching means, said bias supplying means, and said impedance conversion means are fabricated on a single semiconductor substrate.

11. A receiving mixer circuit according to claim 10, wherein the source of said dual-gate FET is connected to a resistor and a capacitor in parallel, whose other ends are grounded to bias the first and second gates of said dual-gate FET to ground potential.

12. A receiving mixer circuit according to claim 9, wherein the source of said dual-gate FET is connected to a resistor and a capacitor in parallel, whose other ends are grounded to bias the first and second gates of said dual-gate FET to ground potential.

13. A mobile communication radio transceiver comprising: a receiving mixer circuit according to claim 8; demodulating means for demodulating the outputs of said impedance conversion means; and a speaker for converting the demodulated signals into sound.

14. A receiving mixer circuit according to claim 1, wherein lumped-constant circuits are used as said impedance conversion circuits.

15. A receiving mixer circuit according to claim 14, wherein said mixer uses a dual-gate FET whose source is grounded, whose first gate is connected to a receive frequency matching means and a first gate bias supplying means, whose second gate is connected to a local oscillator frequency matching means and a second gate bias supplying means, and whose drain is connected to a receive intermediate frequency matching means and a drain bias supplying means.

16. A receiving mixer circuit according to claim 15, wherein said dual-gate FET, said frequency matching means, said bias supplying means, and said impedance conversion means are fabricated on a single semiconductor substrate.

17. A receiving mixer circuit according to claim 16, wherein the source of said dual-gate FET is connected to a resistor and a capacitor in parallel, whose other ends are grounded to bias the first and second gates of said dual-gate FET to ground potential.

18. A receiving mixer circuit according to claim 15, wherein the source of said dual-gate FET is connected to a resistor and a capacitor in parallel, whose other ends are grounded to bias the first and second gates of said dual-gate FET to ground potential.

19. A mobile communication radio transceiver comprising: a receiving mixer circuit according to claim 14; demodulating means for demodulating the outputs of said impedance conversion means; and a speaker for converting the demodulated signals into sound.

20. A receiving mixer circuit according to claim 1, wherein said mixer uses a dual-gate FET whose source is grounded, whose first gate is connected to a receive frequency matching means and a first gate bias supplying means, whose second gate is connected to a local oscillator frequency matching means and a second gate bias supplying means, and whose drain is connected to a receive intermediate frequency matching means and a drain bias supplying means.

21. A receiving mixer circuit according to claim 20, wherein a dual-gate FET, said frequency matching means, said bias supplying means, and said impedance conversion means are fabricated on a single semiconductor substrate.

22. A receiving mixer circuit according to claim 21, wherein the source of said dual-gate FET is connected to a resistor and a capacitor in parallel, whose other ends are grounded to bias the first and second gates of said dual-gate FET to ground potential.

23. A receiving mixer circuit according to claim 20, wherein the source of said dual-gate FET is connected to a resistor and a capacitor in parallel, whose other ends are grounded to bias the first and second gates of said dual-gate FET to ground potential.

24. A mobile communication radio transceiver comprising: a receiving mixer circuit according to claim 20; demodulating means for demodulating the outputs of said impedance conversion means; and a speaker for converting the demodulated signals into sound.

25. A mobile communication radio transceiver comprising: a receiving mixer circuit according to claim 1; demodulating means for demodulating the outputs of said impedance conversion means; and a speaker for converting the demodulated signals into sound.

* * * * *